(12) United States Patent
Lee

(10) Patent No.: US 9,640,785 B2
(45) Date of Patent: May 2, 2017

(54) EMBEDDED FRAME FOR POUCH-TYPE SECONDARY BATTERY AND SECONDARY BATTERY HAVING EMBEDDED FRAME

(71) Applicant: SK INNOVATION CO., LTD., Seoul (KR)

(72) Inventor: Jae Myoung Lee, Daejeon (KR)

(73) Assignee: SK INNOVATION CO., LTD., Seoul (KR)

( * ) Notice: Subject to any disclaimer, the term of this patent is extended or adjusted under 35 U.S.C. 154(b) by 55 days.

(21) Appl. No.: 14/647,033

(22) PCT Filed: Nov. 22, 2013

(86) PCT No.: PCT/KR2013/010681
§ 371 (c)(1),
(2) Date: May 22, 2015

(87) PCT Pub. No.: WO2014/081239
PCT Pub. Date: May 30, 2014

(65) Prior Publication Data
US 2015/0303412 A1    Oct. 22, 2015

(30) Foreign Application Priority Data
Nov. 23, 2012   (KR) .................. 10-2012-0133834

(51) Int. Cl.
*H01M 2/02* (2006.01)
*H01M 2/10* (2006.01)
*H01M 2/40* (2006.01)

(52) U.S. Cl.
CPC ......... *H01M 2/0202* (2013.01); *H01M 2/021* (2013.01); *H01M 2/026* (2013.01);
(Continued)

(58) Field of Classification Search
CPC .... H01M 2/0202; H01M 2/40; H01M 2/0287; H01M 2/1094; H01M 2/026;
(Continued)

(56) References Cited

U.S. PATENT DOCUMENTS

2006/0024568 A1   2/2006   Lee
2009/0186270 A1*  7/2009   Harada ............... H01M 2/0267
                                                    429/185

(Continued)

FOREIGN PATENT DOCUMENTS

JP     2003-151512    5/2003
KR     1020070012809  1/2007
(Continued)

*Primary Examiner* — Cynthia K Walls
(74) *Attorney, Agent, or Firm* — I P & T Group LLP

(57) ABSTRACT

The present invention relates to an embedded frame for pouch-type secondary batteries and a secondary battery having the embedded frame. The embedded frame is provided in a pouch casing for a secondary battery so as to maintain the external shape of the pouch casing and additionally protect an electrode assembly from an external shock. The embedded frame has a rectangular shape and makes close contact with an inner surface of the pouch casing. The electrode assembly is housed in the embedded frame. A plurality of pores is formed in the embedded frame.

12 Claims, 4 Drawing Sheets

(52) U.S. Cl.
CPC ........... *H01M 2/0287* (2013.01); *H01M 2/10* (2013.01); *H01M 2/1094* (2013.01); *H01M 2/40* (2013.01); *H01M 2002/0205* (2013.01); *H01M 2220/30* (2013.01)

(58) Field of Classification Search
CPC .... H01M 2/021; H01M 2/10; H01M 2220/30; H01M 2002/0205
See application file for complete search history.

(56) References Cited

U.S. PATENT DOCUMENTS

| | | | |
|---|---|---|---|
| 2011/0003185 A1* | 1/2011 | Kritzer | F16J 15/064 429/56 |
| 2011/0086265 A1* | 4/2011 | Suzuki | H01M 2/0267 429/186 |
| 2013/0323563 A1* | 12/2013 | Eo | H01M 2/30 429/120 |

FOREIGN PATENT DOCUMENTS

| | | |
|---|---|---|
| KR | 1020110018439 | 2/2011 |
| KR | 1020120037815 | 4/2012 |

* cited by examiner

EMBEDDED FRAME FOR POUCH-TYPE SECONDARY BATTERY AND SECONDARY BATTERY HAVING EMBEDDED FRAME

CROSS REFERENCE TO RELATED APPLICATION(S)

This application is a national stage application of PCT/KR2013/010681 filed on Nov. 22, 2013, which claims priority of Korean patent application number 10-2012-0133834 filed on Nov. 23, 2012. The disclosure of each of the foregoing applications is incorporated herein by reference in its entirety.

TECHNICAL FIELD

The present invention relates to an embedded frame for pouch-type secondary batteries and to a secondary battery having the embedded frame.

BACKGROUND ART

Secondary batteries are widely used in devices ranging from electronic devices such as cellular phones, notebook computers, digital cameras, and camcorders to electric vehicles or hybrid vehicles. Unlike primary batteries, secondary batteries can be repeatedly recharged. Particularly, with rapid technological advances, smaller and lighter large-capacity and high-power secondary batteries have recently been developed.

Such secondary batteries can be manufactured in a variety of forms, having, for example, a pouch, cylindrical, or polygonal shape.

For a pouch-type secondary battery, a pouch casing has a multilayered structure that includes a thin metal film and insulating films attached to both sides of the thin metal film, and is flexible, unlike a cylindrical or polygonal secondary battery made of a comparatively thick metal plate. Moreover, the pouch-type secondary battery is light and small compared to those made of metal, and can be easily adapted to the desired battery shape, or to suit the method of installing the battery in an electronic device or the like. In light thereof, the pouch-type secondary battery has many advantages as a secondary battery.

To produce such a pouch-type secondary battery, an electrode assembly and electrolyte are put in the pouch casing, and then vacuum pressure is applied to the pouch casing before the pouch casing is sealed. Electrode tabs are connected to the electrode assembly and extend outward from the pouch casing so as to electrically connect the electrode assembly to an external circuit.

The electrode assembly housed in the pouch casing is made of a multilayered film that includes a positive plate, a separator, and a negative plate that are successively placed on top of one another. The electrode assembly may be provided to have a form of a jelly roll, formed by winding the multilayered film. For the jelly roll, a separator is provided on the surface of an electrode that is exposed to the outside, thus preventing a short circuit between the positive plate and the negative plate when the jelly roll is wound.

The conventional pouch-type secondary battery is, however, disadvantageous in that, when a vacuum is applied to the pouch casing with the electrode assembly disposed in the pouch casing, the corners of the forming part in which the jelly roll is disposed are easily crushed and deformed.

One reason for this is that the separator, which is thin and is made of material having comparatively low hardness, is disposed around the most peripheral portion of the jelly roll. Another reason is that the pouch casing itself is made of flexible material having comparatively low stiffness, which is thus not able to reliably protect the electrode assembly.

DISCLOSURE

Technical Problem

Accordingly the present invention has been made keeping in mind the above problems occurring in the prior art, and an object of the present invention is to provide an embedded frame for pouch-type secondary batteries that is disposed in a pouch casing and encloses and protects an electrode assembly, whereby the electrode assembly can be prevented from being crushed or deformed by vacuum pressure applied to the pouch casing during a process of manufacturing a secondary battery so that the dimensions of the final product can be precisely embodied, the embedded frame can reliably protect the electrode assembly from an external force even if such external force is applied to the secondary battery, and the capacity of the battery can be enhanced because the embedded flame storing electrolyte therein discharges an appropriate amount of electrolyte when needed and supplies it into the pouch casing to replenish the pouch casing with electrolyte, and another object of the present invention is to provide a secondary battery having the embedded frame.

Technical Solution

In order to accomplish the above object, in an aspect, the present invention provides an embedded frame for a pouch-type secondary battery. The embedded frame is installed in a pouch casing of the secondary battery to retain an outer shape of the pouch casing and protect an electrode assembly from an external shock. The embedded frame has a rectangular shape and makes close contact with an inner surface of the pouch casing. The electrode assembly is housed in the embedded frame. A plurality of pores is formed in the embedded frame.

The electrode assembly may have a planar shape and include a pair of electrode tabs on an end thereof. The embedded frame may have a reception space to receive the electrode assembly therein and enclose a peripheral portion of the electrode assembly disposed in the reception space. Electrode-tab depressions may be formed in an upper surface of an end of the embedded frame so that the electrode tabs are disposed in the respective electrode-tab depressions.

An adiabatic holder may be provided in each of the electrode-tab depressions. The adiabatic holder may prevent heat generated from the corresponding electrode tab from being transferred to the embedded frame.

The embedded frame may include a plurality of frame parts assembled with each other. An elastic means may be prodded between the frame parts and serve to elastically space the flame parts apart from each other.

The elastic means may include: supports provided on respective facing surfaces of the frame parts; and a spring installed between the supports. The spring may elastically space the supports apart from each other.

A circulation passage may be formed in the embedded frame. The circulation passage may extend in a longitudinal direction of the embedded frame and form a rectangular closed loop. An electrolyte may be stored in the circulation passage.

The embedded frame may be made of any one selected from among polyimide (PI), polyethylene terephthalate (PET), and polyphenylene sulfide (PPS).

In another aspect, the present invention provides a secondary battery, including: a pouch casing defining a sealed internal space; an electrode assembly housed along with an electrolyte in the pouch casing, the electrode assembly comprising electrode tabs extending outward from the pouch casing; and an embedded frame disposed in the pouch casing and making close contact with an inner surface of the pouch casing, with the electrode assembly housed in the embedded frame, and a plurality of pores formed in the embedded frame.

The electrode assembly may have a planar shape and include a pair of electrode tabs on an end thereof. The embedded frame may have a reception space to receive the electrode assembly therein and enclosing a peripheral portion of the electrode assembly disposed in the reception space. Electrode-tab depressions may be formed in an upper surface of an end of the embedded frame so that the electrode tabs are disposed in the respective electrode-tab depressions.

An adiabatic holder may be provided in each of the electrode-tab depressions. The adiabatic holder may prevent heat generated from the corresponding electrode tab from being transferred to the embedded frame.

The embedded frame may include a plurality of frame parts assembled with each other. An elastic means may be provided between the frame parts and serve to elastically space the frame parts apart from each other.

The elastic means may include: supports provided on respective facing surfaces of the frame parts; and a spring installed between the supports, the spring elastically spacing the supports apart from each other.

A circulation passage may be formed in the embedded frame. The circulation passage may extend in a longitudinal direction of the embedded frame and form a rectangular closed loop. An electrolyte may be stored in the circulation passage.

The embedded frame may be made of any one selected from among polyimide (PI), polyethylene terephthalate (PET), and polyphenylene sulfide (PPS).

The above and other objects, features and advantages of the present invention will be more clearly understood from the following detailed description taken in conjunction with the accompanying drawings.

The terms and words used in the specification and claims must not be limited to typical or dictionary meanings, but must be regarded as concepts selected by the inventor as concepts which best illustrate the present invention, and must be interpreted as having meanings and concepts adapted to the scope and spirit of the present invention to aid in understanding the technology of the present invention.

Advantageous Effects

The present invention provides an embedded frame for pouch-type secondary batteries and a secondary battery having the embedded frame. The embedded frame is disposed in a pouch casing and encloses and protects an electrode assembly so that the electrode assembly can be prevented from being crushed or deformed by vacuum pressure applied to the pouch casing during a process of manufacturing a secondary battery, whereby the dimensions of the final product can be precisely embodied. Furthermore, even if external force is applied to the secondary battery, the embedded frame can reliably protect the electrode assembly from the external force. The capacity of the battery can be enhanced because the embedded frame storing electrolyte therein discharges an appropriate amount of electrolyte when needed, and supplies it into the pouch casing to replenish the pouch casing with electrolyte.

BEST MODE

Figure 1:
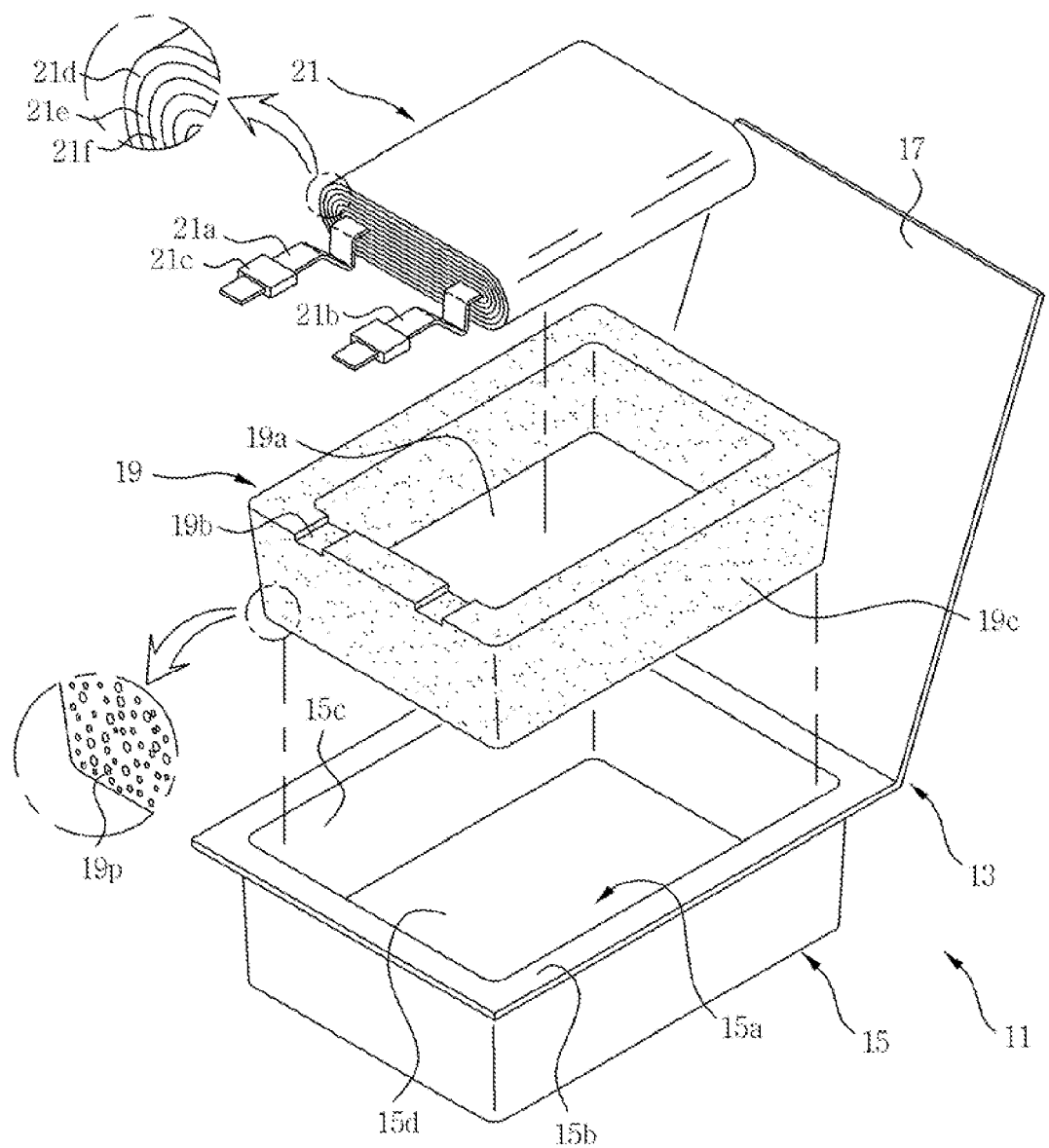
FIG. 1 is an exploded perspective view illustrating an embedded frame for pouch-type secondary batteries and a secondary battery having the embedded frame according to an embodiment of the present invention.

The above and other objects, features and other advantages of the present invention will be more clearly understood from the following detailed description when taken in conjunction with the accompanying drawings.

As for reference numerals associated with parts in the drawings, the same reference numerals will refer to the same or like parts throughout the drawings.

It will be understood that, although the terms "one surface," "another surface," "first," "second," etc. may be used herein to describe various elements, these elements should not be limited by these terms. These terms are only used to distinguish one element from another element.

In the description, details of well-known features and techniques may be omitted to avoid unnecessarily obscuring the presented embodiments.

Hereinbelow, exemplary embodiments of the present invention will be described in detail with reference to the accompanying drawings.

Figure 2:
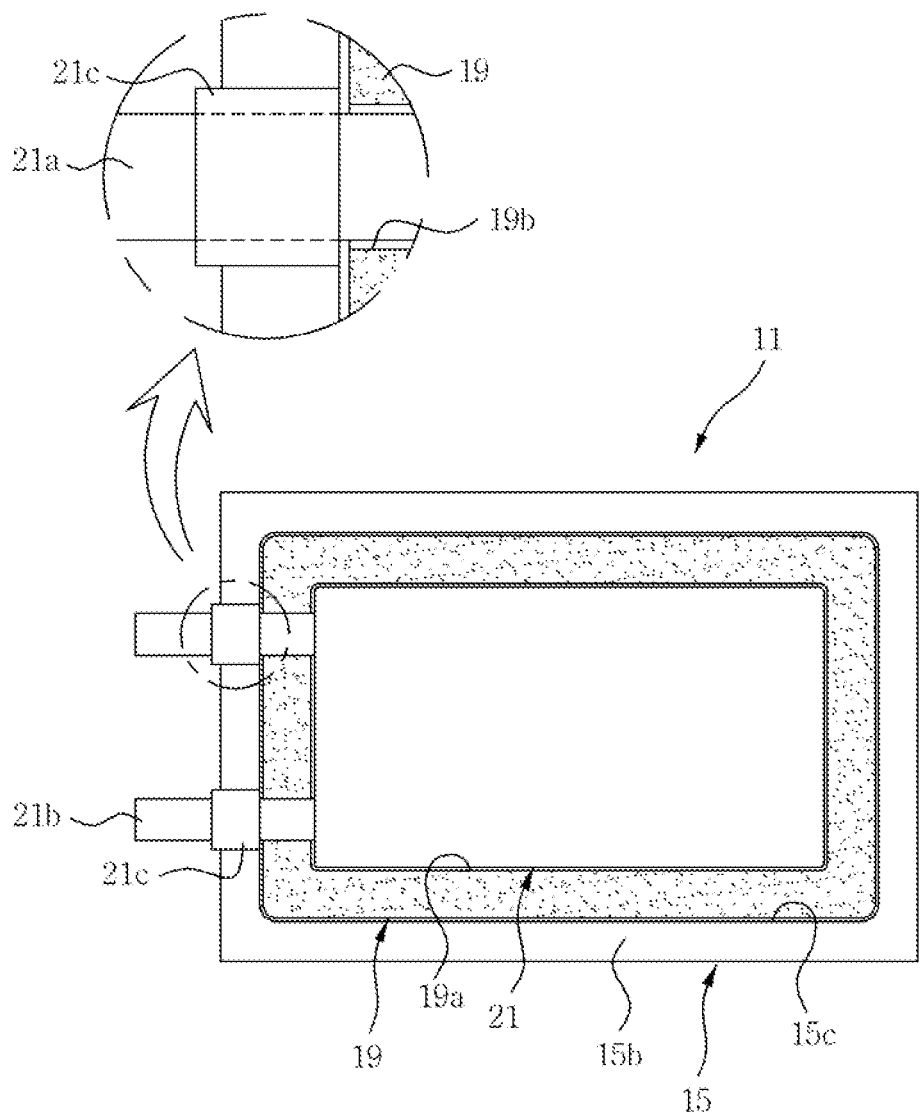
FIG. 2 is a plan view of the secondary battery of FIG. 1.

FIG. 1 is an exploded perspective view illustrating an embedded frame 19 for pouch-type secondary batteries and a secondary battery 11 having the embedded frame according to an embodiment of the present invention. FIG. 2 is a plan view of the secondary battery of FIG. 1.

As shown in the drawings, the secondary battery 11 according to embodiment of the present invention includes an electrode assembly 21, a pouch casing 13 that airtightly houses the electrode assembly 21 therein, and an embedded frame 19 that is installed in the pouch casing 13 with the electrode assembly 21 and electrolyte housed in the pouch casing 13. The embedded frame 19 functions internally to protect the electrode assembly 21 and externally to retain the form of the secondary battery 11.

The electrode assembly 21 has a jelly roll shape and includes a positive plate 21d, a negative plate 21f and a separator 21e. The separator 21e is interposed between the positive plate 21d and the negative plate 21f so as to separate the negative plate 21f from the positive plate 21d. In this embodiment, although the positive plate 21d, the negative plate 21f, and the separator 21e are wound to form a jelly roll shape, they may alternatively have a stacked shape.

A chalcogenide compound is used as the active material for the positive electrode of the positive plate 21d. Complex metal oxides such as $LiCoO_2$, $LiMn_2O_4$, $LiNiO_2$, $LiNi1-xCoxO_2$ (0<x>1), $LiMnO_2$, etc, are examples of the chalcogenide compound. Carbon-based material, Si, Sn, composite tin alloys, transition metal oxide, lithium metal nitride, lithium metal oxide, etc. can be used as the active material for the negative electrode.

The positive plate 21d may be made of aluminum (Al), and the negative plate 21f may be made of copper (Cu). Polyethylene (PE) or polypropylene (PP) can be used as the material for the separator 21e. However, in the present invention, the positive electrode active material, the negative electrode active material, and the materials of the positive plate and the negative plate are limited to the above materials.

Electrode tabs 21a and 21b are respectively connected to the positive plate 21d and the negative plate 21f. The electrode tabs 21a and 21b, each of which has a band shape with a predetermined width, extend in the longitudinal direction of the pouch casing 13 and protrude outward from the pouch casing 13.

The pouch casing 13 includes a main body 15 that has a bottom part 15d and wall parts 15c and defines an internal space 15a therein, and a cover 17 that is integrally provided on the main body 15 and fused to the main body 15 to seal the internal space 15a. Reference numeral 15b is a fusible part, at which the main body 15 is fused to the cover 17.

The pouch casing 13 is made of aluminum and houses the electrode assembly 21, electrolyte, and the embedded frame 19, which will be explained in detail later herein. The pouch casing 13 is sealed with the electrode tabs 21a and 21b placed on the fusion part 15b of the pouch casing 13. Particularly, insulation tape 21c is provided on each electrode tab 21a, 21b so that the pouch casing 13 can be insulated from the electrode tabs 21a and 21b.

The embedded frame 19 is approximately rectangular, and is disposed along with the electrode assembly 21 in the internal space 15a of the main body 15 with the electrode assembly 21 received in the embedded frame 19. A reception space 19a is formed in the embedded frame 19, so that the electrode assembly 21 can be disposed in the embedded flume 19.

Particularly, the outer surface of the embedded frame 19 functions as a pressurizing surface 19c. The embedded frame 19 makes close contact with the four wall parts 15c of the main body 15 and outwardly supports the wall parts 15c. As such because the embedded frame 19 outwardly supports the main body 15, the secondary battery 11, that is the final product, can be prevented from being crushed or deformed by external force. To achieve the above-stated purpose, the embedded frame 19 has sufficient stiffness to prevent it from being deformed by external three.

The embedded frame 19 may be made of polymer resin, having not only comparatively high strength and thermal resistance but also chemical resistance. For instance, the embedded frame 19 may be made of polyimide (PI), polyethylene terephthalate (PET), or polyphenylene sulfide (PPS).

Furthermore, an enormously large number of pores 19p is formed in the embedded frame 19. The pores 19p are formed simultaneously with the formation of the embedded frame 19, and absorb some of the electrolyte when the electrolyte is injected into the pouch casing 13. Therefore, a larger amount of electrolyte is injected into the pouch casing 13 than the amount of electrolyte that would be injected thereinto if the embedded frame 19 were not present.

Even when a large amount of electrolyte is consumed, complete exhaustion of the electrolyte can be prevented because the electrolyte that has been absorbed in the embedded frame 19 can gradually flow out of the embedded frame 19 toward the electrode assembly 21.

Electrode-tab depressions 19b are formed in the upper surface of one end of the embedded frame 19. The electrode tabs 21a and 21b are inserted into respective electrode-tab depressions 19b. In this way, the electrode-tab depressions 19b are formed in the embedded frame 19 and the electrode tabs 21a and 21b are inserted into the respective electrode-tab depressions 19b and thus supported by the embedded frame 19. Thereby, the electrode tabs 21a and 21b can be reliably fixed in place.

Figure 3:
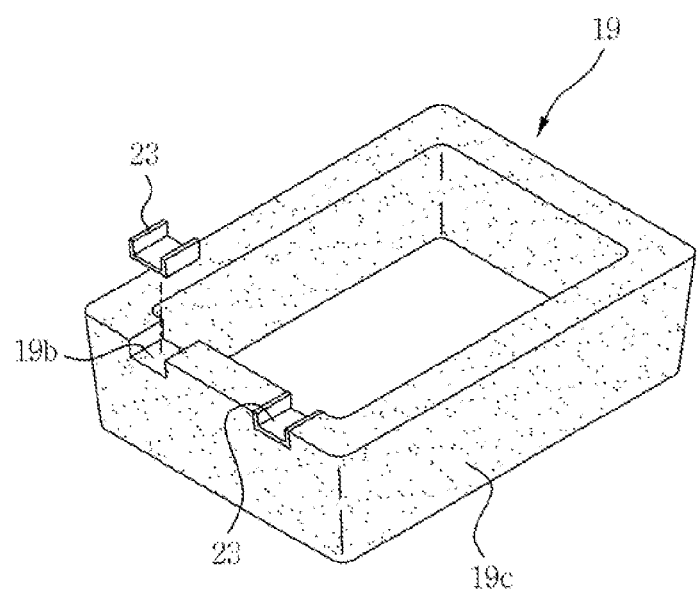
FIG. 3 is an exploded perspective view illustrating another example of the embedded frame for pouch-type secondary batteries according to the embodiment of the present invention.

FIG. 3 is an exploded perspective view illustrating another example of the embedded frame 19 for pouch-type secondary batteries according to the embodiment of the present invention.

Hereinafter, the same reference numerals as those of the above-mentioned elements are used to designate the same or similar elements having the same functions.

Referring to the drawing, an adiabatic holder 23 is fixed in each electrode-tab depression 19b, and is open on the upper end thereof The electrode tabs 21a and 21b are received in respective adiabatic holders 23. Particularly, each adiabatic holder 23 has adiabatic characteristics, thus preventing heat from being transferred from the corresponding, electrode tab 21a, 21b to the embedded frame 19.

By virtue of the use of the adiabatic holders 23, heat can be prevented from being transferred from the electrode tabs 21a and 21b to the embedded frame 19. Thereby, there is no likelihood of thermal fatigue of the embedded frame 19, or of the electrolyte contained in the pores 19p of the embedded frame 19 being heated.

Figure 4:
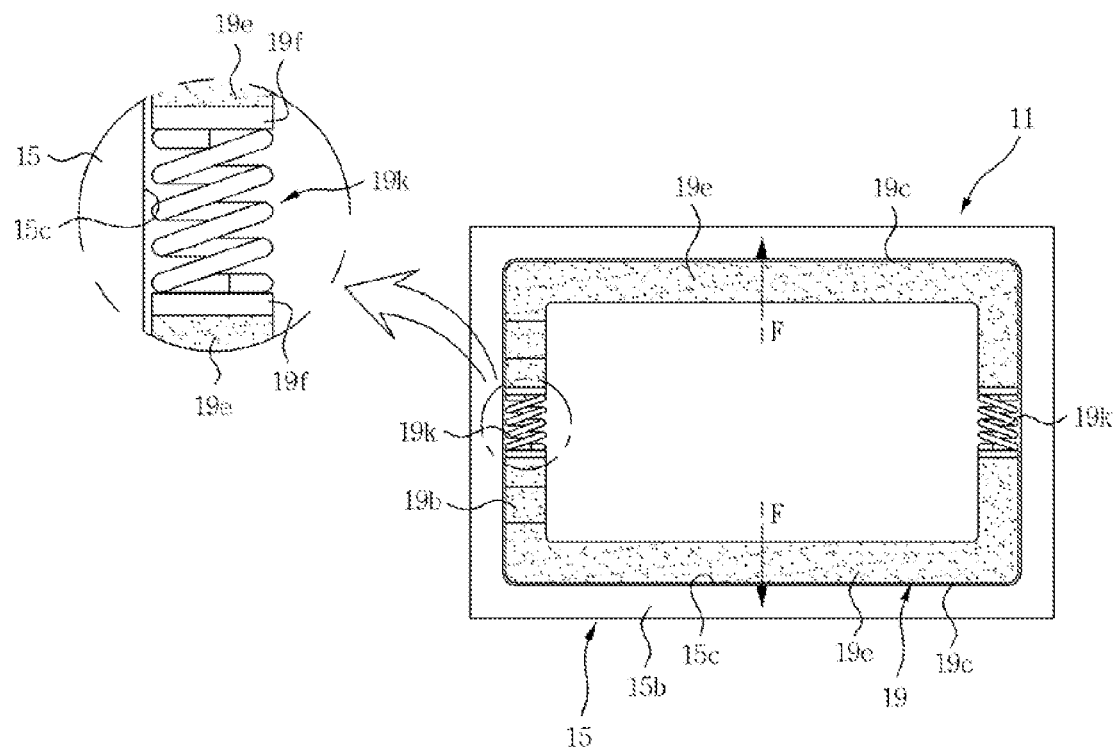
FIG. 4 is a plan view illustrating the structure and operational principle of a further example of the embedded frame for pouch-type secondary batteries according to the embodiment of the present invention.

FIG. 4 is a plan view illustrating the structure and operational principle of a further example of the embedded frame 19 for pouch-type secondary batteries according to the embodiment of the present invention.

The embedded frame 19 embodied in FIG. 4 includes two frame parts 19e that are separated and spaced apart from each other, and springs 19k that elastically space the two frame parts 19e apart from each other.

In detail, as shown in FIG. 4, the embedded flame 19 includes: the two frame parts 19e, which are separated from each other, supports 19f which are provided on respective opposite ends of each frame part 19e and disposed in such a way that the supports 19f of the frame parts 19e face each other and the springs 19k, each of which is installed between the corresponding supports 19f, and which elastically space the support 19f apart from each other.

The frame parts 19e may be formed by separating the embedded frame 19 of FIG. 2 into two parts. Since the embedded frame 19 is rectangular, the opposite ends of the separated frame parts 19e face each other. If the opposite ends of the frame parts 19e that face each other are attached to each other, the frame parts 19e will take the form of a rectangular frame.

The supports 19f are planar members fixed to respective opposite ends of the frame parts 19e. The supports 19f support the corresponding springs 19k and are made of synthetic resin.

As shown in FIG. 4, each spring 19k is interposed between corresponding supports 19f that face each other, and elastically biases the supports 19*f* in directions away from each other. The frame parts 19*e* that are disposed in the main body 15 are elastically pushed in the directions of the arrows F by the operation of the springs 19*k*. In other words, side pressurizing surfaces 19*c* of the frame parts 19*e* elastically pressurize the corresponding wall parts 15*c* of the main body 15.

As such, using the springs 19*k*, the frame parts 19*e* elastically support the wall parts 15*c* of the main body 15 outward. Thereby, the outer surface of the secondary battery 11 can be maintained taut, and the dimensions thereof can also be maintained constant. In addition, the secondary battery can be prevented from being crushed or deformed by external force. Even if an external shock is applied to the secondary battery 11, the springs 19*k* can absorb the shock, thus providing satisfactory shock resistance.

Figure 5:
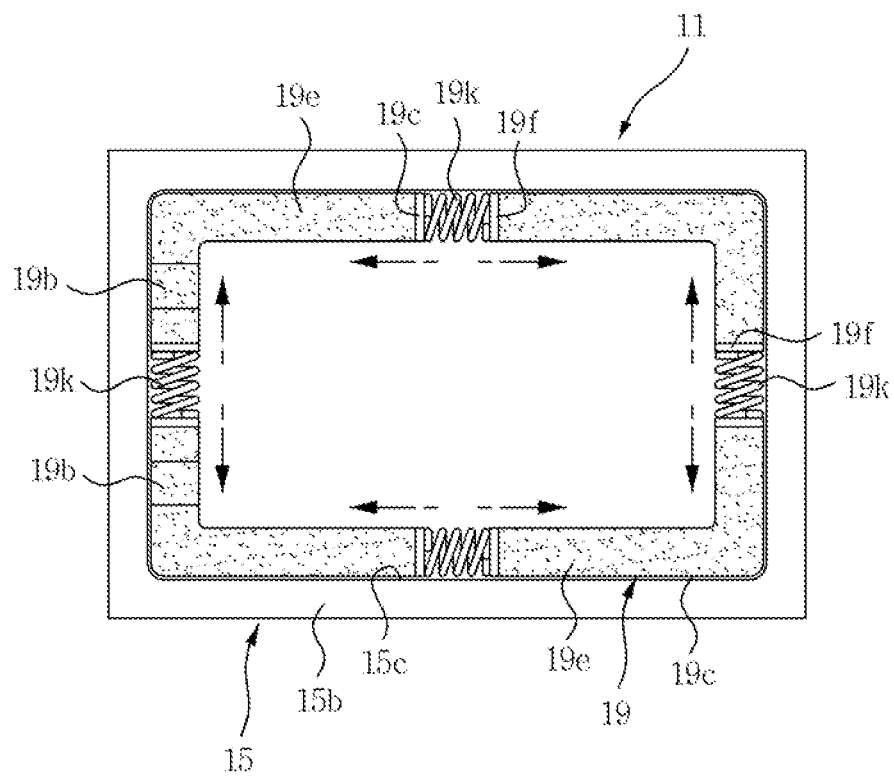
FIG. 5 is a plan view of yet another example of the embedded frame for pouch-type secondary batteries according to the embodiment of the present invention.

FIG. 5 is a plan view of yet another example of the embedded frame 19 for pouch-type secondary batteries according to the embodiment of the present invention.

The embedded frame 19 shown in FIG. 5 includes four frame parts 19*e*, and springs 19*k* and supports 19*f* that are interposed between the frame parts 19*e*.

In this example, the embedded frame 19 is separated into the four frame parts 19*e*, and the springs 19*k* are provided between the four frame parts 19*e*. Thus, the embedded frame 19 that is housed in the internal space 15*a* of the main body 15 is elastically biased outward in longitudinal and lateral directions.

In the same manner as the example of FIG. 4, the outer surface of the secondary battery 11 can be maintained taut, and the dimensions thereof can also be maintained constant. Furthermore, the secondary battery 11 can be prevented from being crushed or deformed by external force. Also, the springs 19*k* function to absorb external shock when it is applied to the secondary battery 11.

Figure 6:
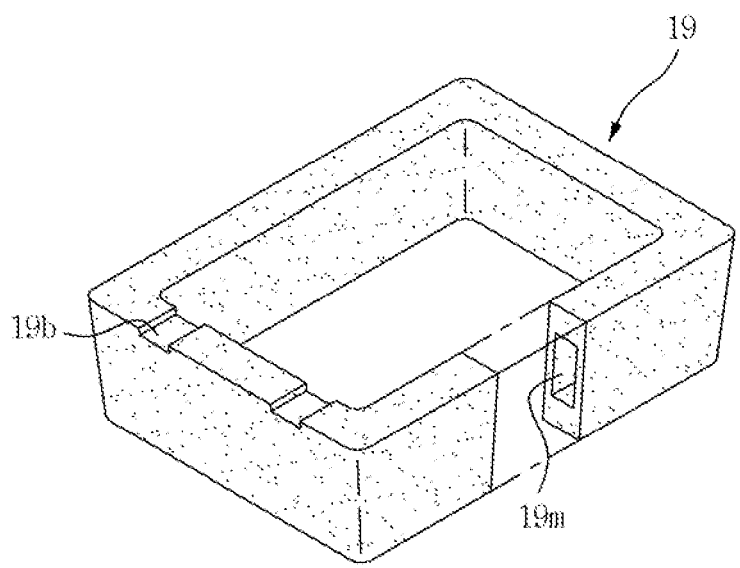
FIG. 6 is a partially broken perspective view of still another example of the embedded frame for pouch-type secondary batteries according to the embodiment of the present invention.

FIG. 6 is a partially broken perspective view of still another example of the embedded frame 19 for pouch-type secondary batteries according to the embodiment of the present invention.

Referring to the drawing, in this example, a circulation passage 19*m* is formed in the embedded frame 19 having a rectangular shape. The circulation passage 19*m* is formed when the embedded frame 19 is manufactured. The circulation passage 19*m* extends in the longitudinal direction of the embedded frame 19 to form a rectangular closed loop.

The circulation passage 19*m* is a space that contains electrolyte therein. When electrolyte is injected into the pouch casing 13 during a process of manufacturing the secondary battery 11, some of the injected electrolyte enters the circulation passage 19*m* through the pores 19*p*, and is temporarily stored therein. Whenever some of the injected electrolyte is consumed, the electrolyte that is temporarily stored in the circulation passage 19*m* flows out of the embedded frame 19 through the pores 19*p* in the required amount, thereby replenishing the pouch casing 13 with electrolyte.

Although exemplary embodiments of the present invention have been disclosed for illustrative purposes, it will be appreciated that the present invention is not limited thereto, and those skilled in the art will appreciate that various modifications, additions and substitutions are possible, without departing from the scope and spirit of the invention.

Accordingly, any and all modifications, variations or equivalent arrangements should be considered to be within the scope of the invention, and the detailed scope of the invention will be disclosed by the accompanying claims.

DESCRIPTION OF THE REFERENCE NUMERALS IN THE DRAWINGS

11: secondary battery
13: pouch casing
15: main body
15*a*: internal space
15*b*: fusion part
15*c*: wall part
15*d*: bottom part
17: cover
19: embedded frame
19*a*: reception space
19*b*: electrode-tab depression
19*c*: pressurizing surface
19*e*: frame part
19*f*: support
19*k*: spring
19*m*: circulation passage
19*p*: pore
21: electrode assembly
21*a*, 21*b*: electrode tab
21*c*: insulation tape
21*d*: positive plate
21*e*: separator
21*f*: negative plate
23: adiabatic holder

The invention claimed is:

1. An embedded frame for a pouch-type secondary battery,
wherein the embedded frame is configured to be installed in a pouch casing of the secondary battery,
wherein the embedded frame has a rectangular shape, configured to make close contact with an inner surface of the pouch casing, to house an electrode assembly, and has a plurality of pores formed in the embedded frame,
wherein an adiabatic holder is provided in each of a plurality of electrode-tab depressions, the adiabatic holder preventing heat generated from the corresponding electrode tab from being transferred to the embedded frame.

2. The embedded frame of claim 1, wherein the electrode assembly has a planar shape and comprises a pair of electrode tabs on an end thereof,
the embedded frame having a reception space to receive the electrode assembly therein and enclosing a peripheral portion of the electrode assembly disposed in the reception space, with electrode-tab depressions formed in an upper surface of an end of the embedded frame so that the electrode tabs are disposed in the respective electrode-tab depressions.

3. The embedded frame of claim 2 comprising a plurality of frame parts assembled with each other, with an elastic means provided between the frame parts, the elastic means serving to elastically space the frame parts apart from each other.

4. The embedded frame of claim 3, wherein the elastic means comprises:
supports provided on respective facing surfaces of the frame parts; and
a spring installed between the supports, the spring elastically spacing the supports apart from each other.

5. The embedded frame of claim 2, wherein a circulation passage is formed in the embedded frame, the circulation passage extending in a longitudinal direction of the embedded frame and foaming a rectangular closed loop, with an electrolyte stored in the circulation passage.

6. The embedded frame of claim I being made of any one selected from among polyimide (PI), polyethylene terephthalate (PET), and polyphenylene sulfide (PPS).

7. A secondary battery, comprising:
a pouch casing defining a sealed internal space;
an electrode assembly comprising electrode tabs extending outward from the pouch casing, the electrode assembly being housed in the pouch casing along with an electrolyte; and
an embedded frame formed with a plurality of pores disposed in the pouch casing and making close contact with an inner surface of the pouch casing;
wherein an adiabatic holder is provided in each of a plurality of electrode-tab depressions, the adiabatic holder preventing heat generated from a corresponding electrode tab from being transferred to the embedded frame.

8. The secondary battery of claim 7, wherein the electrode assembly has a planar shape and comprises a pair of electrode tabs on an end thereof,
the embedded frame having a reception space to receive the electrode assembly therein and enclosing a peripheral portion of the electrode assembly disposed in the reception space, with electrode-tab depressions formed in an upper surface of an end of the embedded frame so that the electrode tabs are disposed in the respective electrode-tab depressions.

9. The secondary battery of claim 7, wherein the embedded frame comprises a plurality of frame parts assembled with each other, with an elastic means provided between the frame parts, the elastic means serving to elastically space the frame parts apart from each other.

10. The secondary battery of claim 9, wherein the elastic means comprises:
supports provided on respective facing surfaces of the frame parts; and
a spring installed between the supports, the spring elastically spacing the supports apart from each other.

11. The secondary battery of claim 7, wherein a circulation passage is formed in the embedded frame, the circulation passage extending in a longitudinal direction of the embedded frame and forming a rectangular closed loop, with an electrolyte stored in the circulation passage.

12. The secondary battery of claim 7, wherein the embedded frame is made of any one selected from among polyimide (PI), polyethylene terephthalate (PET), and polyphenylene sulfide (PPS).

* * * * *